Dec. 29, 1936.   W. G. MYLIUS   2,066,299
DETACHABLE METER CONSTRUCTION
Filed Jan. 19, 1935
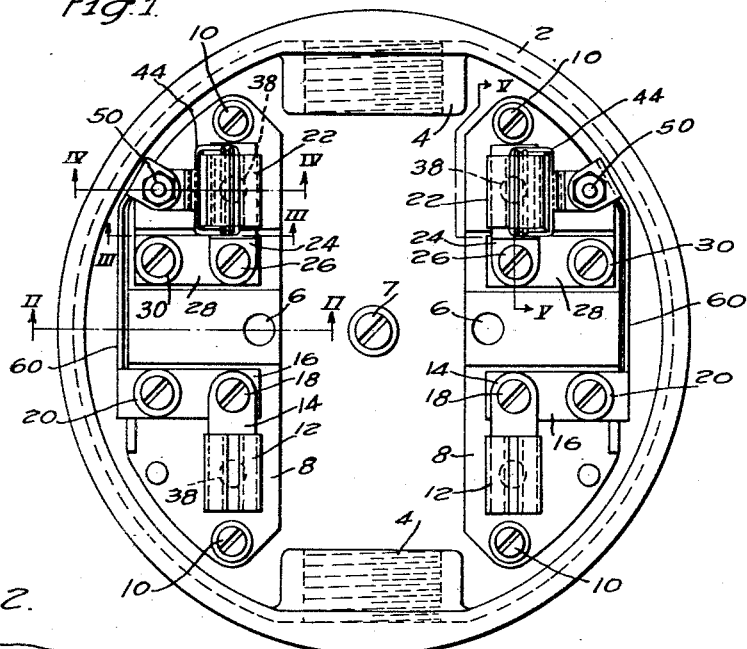
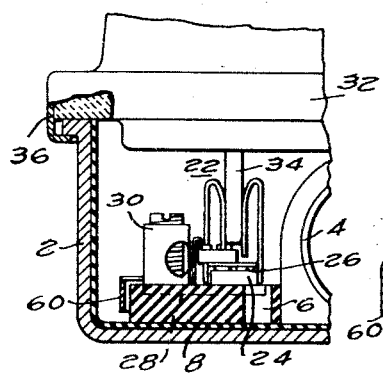
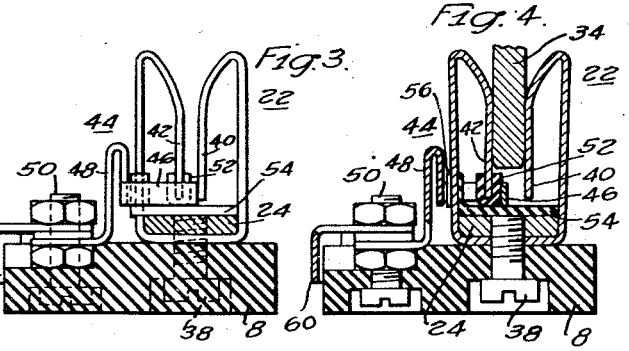
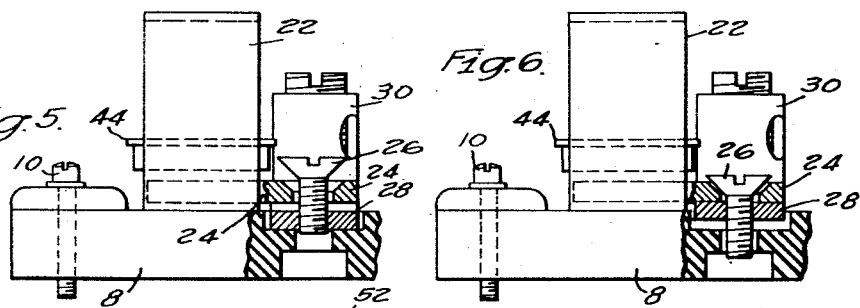
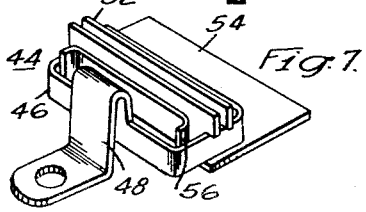
WITNESSES:
E. A. M'Closkey
Wm. C. Groome
INVENTOR
Walter G. Mylius.
BY
ATTORNEY Patented Dec. 29, 1936

2,066,299

UNITED STATES PATENT OFFICE 2,066,299

DETACHABLE METER CONSTRUCTION

Walter G. Mylius, Summit, N. J., assignor to Westinghouse Electric & Manufacturing Company, East Pittsburgh, Pa., a corporation of Pennsylvania Application January 19, 1935, Serial No. 2,534

1 Claim. (Cl. 200—2)

The present invention relates to watthour meters of the general character shown in United States Patent No. 1,969,499, issued August 7, 1934, and more specifically to an improved construction of the terminal chamber or sub-base upon which such meters are supported.

In meters of the above-mentioned character, four contact blades usually project from the base thereof and are connected inside the meter to the current and potential windings. Two of the blades are for connection to the incoming or supply circuit, and the remaining two are for connection to the load circuit. The terminal chamber or sub-base for such meters usually comprises, as in the above-numbered patent, four contact jaws, two of which are for connection to the supply circuit and the other two to the load circuit, and which are adapted to receive the contact blades projecting from the meter base. With this type of construction, the meter itself constitutes, in effect, a switch between the supply and load circuits, and if it is withdrawn for testing, repairs, or any other reason, the load circuit will be interrupted, thereby possibly inconveniencing the consumer.

It is an object of the present invention to provide, in a terminal chamber for meters of the above character, an auxiliary circuit closing device which is ineffective when the meter is in operating position on the chamber but, when the meter is withdrawn, a shunt is established between the respective supply and load contact jaws so that there is no interruption to the consumer's service.

The invention is a modification of, and an improvement on, a similar type of device described and claimed in copending application Serial No. 746,188, filed September 29, 1934 by W. G. Mylius, and assigned to the Westinghouse Electric & Manufacturing Company.

Referring to the drawing,

Figure 1 is a plan view of a terminal chamber or sub-base for a meter of the detachable type embodying the present invention;

Figure 2 is an enlarged view in section taken on the line II—II of Fig. 1;

Figs. 3, 4 and 5 are enlarged views in section, taken respectively on the lines III—III, IV—IV and V—V of Fig. 1;

Fig. 6 is a view, in elevation, partially in section, indicating the operation of the structure shown in Fig. 5; and Fig. 7 is a view in perspective of an auxiliary circuit closing device contemplated by the present invention.

Referring more specifically to the drawing, the terminal chamber or sub-base comprises a substantially cylindrical chamber 2 having diametrically opposed threaded bosses 4 for receiving suitable conduit fittings. It is contemplated that the supply conductors will enter through one of the threaded bosses 4 and be connected with the terminals within the chamber as hereinafter described, and the load conductors will leave the chamber through the other threaded boss 4.

The chamber 2 may be secured to a support in any suitable manner, as by inserting screws through apertures 6, or by making use of the centrally disposed screw 7. The screw 7 may also be used for making a ground connection, if such is required.

Within the chamber 2 are disposed two terminal blocks 8, suitably secured to the base of the chamber as by screws 10, and disposed on opposite sides of the threaded bosses 4 to define substantially a channel between such bosses.

Each terminal block 8 has secured thereon a contact jaw 12 which is electrically connected to a conducting strap 14 secured to a strap 16 by means of a screw 18. The strap 16 is electrically connected with a terminal post 20, adapted to be connected to one of the wires of the circuit with which the meter is to be associated.

Each terminal block 8 also has secured thereto a contact jaw 22 which is electrically connected through a conducting strap 24, screw 26, conducting strap 28, to a terminal post 30, for connection to a conductor of the aforesaid circuit.

It is contemplated, in usual practice, that two service conductors may enter through the upper boss 4 and be respectively connected to the terminal posts 30, and two load conductors will enter through the lower boss 4 and be electrically connected to the terminal posts 20.

Referring to Fig. 2, the terminal chamber is adapted to receive an encased meter element 32 having 4 contact blades 34 (only one of which is shown) and which is suitably secured to the chamber 2 by a clamping ring 36.

Referring to Fig. 3, each terminal 22 comprises a member of substantially U-shape, and preferably of resilient strip material, having the free ends thereof return-bent to define a slot for receiving a contact blade 34. The jaw 22 is maintained in position by means of a screw 38, extending through the block 8, and the base of the jaw into threaded engagement with the conducting strap 24.

The free ends 40 and 42 of the jaw are spaced a distance less than the thickness of a contact blade 34 and the extremities of the ends may be in contacting relation, or substantially so, so that the entering contact blade exerts a wedging effect to move the free ends laterally. The ends 40 and 42 constitute resilient members for tightly gripping the blade to insure an efficient electrical contact.

Each of the jaws 22 is provided with an auxiliary circuit closing device indicated generally as 44, and shown in detail in Fig. 7. This device comprises a member 46 of loop-shape being proportioned to encircle one leg of the jaw and its free end 42. The member 46 is supported by means of a return-bent strap 48 of resilient material, preferably integral with the loop 46, which may be clamped in position by means of a bolt 50 extending through the block 8.

When the auxiliary circuit controlling device 44 is mounted in operative position, as shown in Fig. 3, the outer edge of the loop is resiliently clamped between the two free ends 40 and 42 of the contact jaw. The free end 40 engages the loop in electrically conducting relation, but the end 42 is insulated therefrom by insulation 52 which substantially encases the extremity of the free end 42 to insulate it on all sides from the loop member 46. As shown more clearly in Fig. 7, the insulation 52 may be provided with projecting portions engaging the top edge of the side arms of the loop, to maintain it in operative position upon the extremity of the free end 42.

As an additional precaution, an insulating plate or strip 54 may extend substantially the width of the jaw 22 beneath the extremities of the ends 40 and 42 thereof, and having a portion 56 bent at right angles to extend upwardly along the leg of the jaw and having portions bent laterally to embrace the sides of said leg.

It should be apparent that the provision of the insulation above described prevents any contact between the loop 46 and the portions of the jaw which it encircles.

When the meter is not in position, that is, when the contact blade 34 is withdrawn from the jaw 22, there will be a direct electrical connection between the mounting bolt 50 and the free end 40 of the jaw. When the blade is inserted, however, the free ends 40 and 42 of the jaw are displaced laterally to break the connection between the end 40 and the loop 46 as indicated in Fig. 4. In the latter position, there is no electrical connection whatever between the jaw 22 and the mounting bolt 50.

A conducting strap 60 may be extended, as shown in Fig. 1, between the terminal post 20, which is electrically connected to the contact jaw 12, and the mounting bolt 50 which is electrically connected to the auxiliary contact means 44. Therefore, when the meter is withdrawn from service and the contact jaw 22 is in the position shown in Fig. 3, there will be an electrical connection between, or shunt across, the two terminals 12 and 22 to provide an auxiliary circuit through the terminal chamber 2 when the meter is withdrawn. When the meter is in operative position the electrical connection, or shunt, is broken.

An additional control for the connection between the jaws 12 and 22 may be effected through the screws 18 and 26, which are used to clamp respectively, the straps 14 and 16, and 24 and 28. This construction is shown in detail in Figs. 5 and 6 with reference to one of the jaws 22. It will be noted, referring to Fig. 5, that the strap 28 upon which the terminal post 30 is supported normally lies slightly below the plane of the lower face of the strap 24. When the screw 26 is loosened, as shown, there will be no electrical connection between the straps 24 and 28 because the screw extends loosely through the strap 24.

When, however, the screw 26 is tightened to the position shown in Fig. 6, the strap 28 is raised to a position to contact with the strap 24, thereby completing the circuit from the jaw 22 to the terminal post 30. If, therefore, it is desired to disconnect a consumer's circuit, the meter may be removed and screws 18 or 26, or both, may be loosened and the meter reinserted in position and properly sealed to prevent reconnection of the consumer's circuit.

Referring again to Fig. 1, it will be noted that the terminal post 30, screw 26, jaw 22 and screw 50 extend through holes in the terminal block 8, the centers of which define a square; that is, the axes of the holes are disposed symmetrically with respect to a common center. In the event that the conduit system, with which the chamber 2 is to be used, extends in a horizontal direction, necessitating a rotation of the casing 2, through an angle of 90° from the position shown, it is necessary to reverse the positions of the jaws 22, so that the watthour meter may be installed in its proper upright position. In such event, the screws 50 will be inserted through the holes formerly occupied by the screws 26 and the conducting straps 24 and 28 will be rotated toward each other through an angle of 90°, so that their registering openings register with the hole formerly occupied by the screw 50. By reason of the symmetrical relationship of the four holes for the securing screws 38, with respect to the center of the casing 2, the distance between contact jaws when so rotated will be the same as before for accommodating the contact blades on the meter.

It should be apparent from the foregoing that the auxiliary circuit closing device applied to the contact jaws is a simple one and requires a minimum of strain on the jaws and at the same time, is in a position to afford an efficient electrical contact with a part of the jaw when the meter is withdrawn from the chamber.

It should also be apparent that the construction shown is applicable to purposes other than mounting watthour meters. The mechanism within the casing 32 may be that of an indicating instrument, time-switch, or in fact any electrical instrumentality which may be adapted to the mounting shown. Further, the scope of the invention contemplates a terminal block assembly for general purposes wherever an auxiliary contact device is desired.

Quite obviously various modifications may be made in the invention without departing from the spirit and scope thereof, and it is desired that only such limitations shall be placed thereon as are imposed by the prior art and set forth in the appended claim.

I claim as my invention:

In a terminal block, a spring jaw contact device having a pair of spaced resilient portions for receiving a contact blade therebetween in such manner that the resilient portions are spread apart by such blade, an auxiliary contact device associated with said spring jaw contact device comprising a member encircling one of said resilient portions and means for supporting it in such position that part of it between the resilient portions is spaced from both portions when the blade is inserted and engages one of the resilient portions when the blade is withdrawn.

WALTER G. MYLIUS.